UNITED STATES PATENT OFFICE.

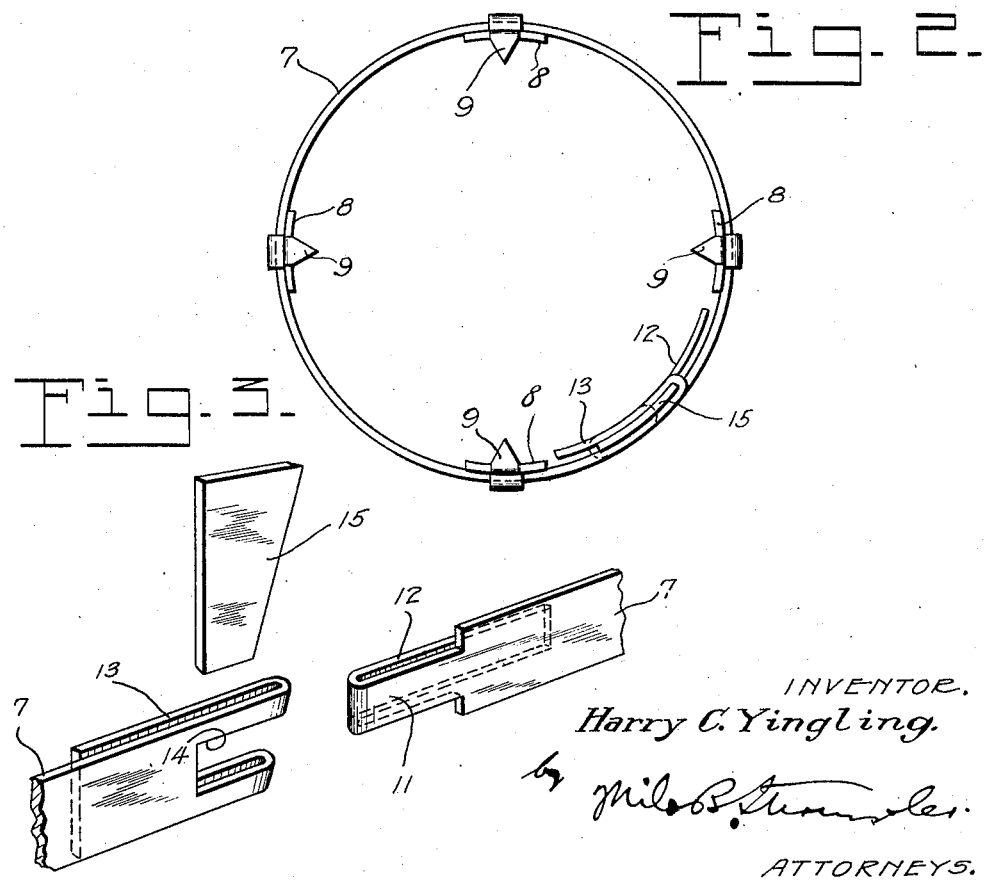

HARRY C. YINGLING, OF WILLIAMSPORT, PENNSYLVANIA.

COUPLING DEVICE.

1,389,282.   Specification of Letters Patent.   Patented Aug. 30, 1921.

Application filed June 7, 1920. Serial No. 387,125.

*To all whom it may concern:*

Be it known that I, HARRY C. YINGLING, a citizen of the United States, residing at Williamsport, in the county of Lycoming and State of Pennsylvania, have invented new and useful Improvements in Coupling Devices, of which the following is a specification.

The device which is the subject matter of the present application for patent has been designed more particularly for fastening together or coupling the two sections of an artificial leg, but it will be understood that the device is not limited to such use, but may, with equal facility, be employed for fastening together other parts.

The invention has for its object to provide a very simple, efficient and easily applied fastening device, and to this end it consists in a novel combination and arrangement of parts to be hereinafter described and claimed.

In order that the invention may be better understood, reference is had to the accompanying drawing forming a part of this specification, and in said drawing, Figure 1 is an elevation of the device;

Fig. 2 is a plan view thereof, and

Fig. 3 is a perspective view of certain parts separated.

Referring specifically to the drawing, 5 and 6 denote fragments of the two sections of an artificial leg or other part, which sections are to be connected or coupled together. The device for effecting this connection consists of a sheet metal or other flexible band 7 which is looped around the parts at the joint therebetween and fastened together at its ends. The band 7 carries clips 8 at suitable intervals which are provided with inturned spurs 9 at their ends, said spurs at one end of the clips being driven into the part 5, and the spurs at the other end into the part 6. The band is therefore securely held around the joint between the parts 5 and 6, and it is prevented from slipping off the same.

Each clip 8 comprises a sheet metal plate at the ends of which the spurs 9 are located, said spurs being integral and pointed so that they may be easily driven into the parts 5 and 6. The clip plate is slitted longitudinally, as shown at 10, and the material between the slits is bent outwardly so that the band 7 may be passed therethrough. This structure provides a simple expedient for attaching the clips to the band.

The means for tightening the bands 7 around the parts 5 and 6, and connecting the band ends, comprise the following parts:

One end of the band 7 has a tongue 11 which is bent back to form a hook 12, and the other end of the band also has a hook 13 which is recessed as shown at 14 to seat the tongue 11. When the ends of the band are brought together to seat the tongue 11 in the recess 14, the hooks 12 and 13 lap, and as they extend in opposite directions, a wedge 15 may be inserted into the hooks. When this wedge is driven inwardly the ends of the band are drawn together in an obvious manner, and the band may in this way be drawn in to tightly embrace the parts 5 and 6. After the wedge is driven home, its small end may be bent up as shown at 16 to prevent accidental withdrawal. It will be noted that the bight of the hook 13 is inclined to match the inclined edge of the wedge.

The device is very easily applied and it effectually serves the purpose for which it is designed, and as it is simple in construction, it can be cheaply produced.

I claim:

A fastening device for two abutting members comprising a band having a width to cover the joint between said members, means for connecting the ends of the band, and spurred clips carried by the band, said clips comprising plates having loops through which the band passes, and said plates projecting from the opposite edges of the band, the projecting portions of the plates having inturned spurs adapted to be driven into the parts which the band encircles on opposite sides of the joint therebetween.

In testimony whereof I affix my signature.

HARRY C. YINGLING.